United States Patent
Wang

(10) Patent No.: US 8,386,496 B2
(45) Date of Patent: *Feb. 26, 2013

(54) SYSTEM AND METHOD FOR EFFECTIVELY IMPLEMENTING A PERSONAL CHANNEL FOR INTERACTIVE TELEVISION

(75) Inventor: David S. Wang, Newark, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,948

(22) Filed: Mar. 7, 2012

(65) Prior Publication Data

US 2012/0180088 A1  Jul. 12, 2012

Related U.S. Application Data

(63) Continuation of application No. 12/172,376, filed on Jul. 14, 2008, now Pat. No. 8,176,059, which is a continuation of application No. 11/498,915, filed on Aug. 3, 2006, now Pat. No. Re. 41,810.

(51) Int. Cl.
*G06F 17/30* (2006.01)
*H04N 5/445* (2011.01)

(52) U.S. Cl. ............ 707/752; 707/999.007; 725/53

(58) Field of Classification Search .......... 707/737, 707/752, 999.002, 999.006, 999.007; 725/51, 725/53, 56, 57

See application file for complete search history.

(56) References Cited

U.S. PATENT DOCUMENTS

| 5,481,296 | A  | * | 1/1996  | Cragun et al.    | 725/136 |
| 5,977,964 | A  | * | 11/1999 | Williams et al.  | 715/721 |
| 6,484,164 | B1 | * | 11/2002 | Nikolovska et al.| 1/1     |
| 6,850,934 | B2 | * | 2/2005  | Bates et al.     | 1/1     |
| 2002/0052864 | A1 |  | 5/2002  | Yamamoto         |         |

FOREIGN PATENT DOCUMENTS

| WO | 01/39494 | 5/2001 |
| WO | 01/73596 | 10/2001 |

* cited by examiner

*Primary Examiner* — Marc Filipczyk
(74) *Attorney, Agent, or Firm* — John L. Rogitz

(57) ABSTRACT

A system and method for effectively implementing a personal channel for interactive television comprises a personal channel manager that may include a configuration module, a search module, and a content packaging module. A system user may utilize the configuration module to perform a personal channel configuration procedure to specify personal channel configuration data for performing a content record search procedure. The search module may manage the content record search procedure according to one or more search parameters that may be defined during the personal channel configuration procedure. The search module finds content records from content databases during the foregoing content record search procedure. The content packaging module coordinates a content record sorting procedure according to user-specified sorting criteria.

5 Claims, 8 Drawing Sheets

130 Fig. 5

SYSTEM AND METHOD FOR EFFECTIVELY IMPLEMENTING A PERSONAL CHANNEL FOR INTERACTIVE TELEVISION

This is a continuation of U.S. patent application Ser. No. 12/172,376, filed Jul. 14, 2008, now U.S. Pat. No. 8,176,059 which is a continuation of U.S. patent application Ser. No. 11/498,915, filed Aug. 3, 2006, now U.S. Pat. No. RE41,810.

BACKGROUND SECTION

1. Field of the Invention

This invention relates generally to techniques for utilizing interactive television systems, and relates more particularly to a system and method for effectively implementing a personal channel for interactive television.

2. Description of the Background Art

Implementing effective methods for utilizing television systems is a significant consideration for designers and manufacturers of contemporary electronic entertainment systems. However, effectively implementing television systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports interactive television may benefit from an efficient implementation because of the large amount and complexity of the digital data involved.

Due to growing demands on system resources and substantially increasing data magnitudes, it is apparent that developing new techniques for implementing and utilizing television systems is a matter of concern for related electronic technologies. Therefore, for all the foregoing reasons, developing effective systems for implementing and utilizing television systems remains a significant consideration for designers, manufacturers, and users of contemporary electronic entertainment systems.

SUMMARY

In accordance with the present invention, a system and method are disclosed for effectively implementing a personal channel for interactive television. In accordance with one embodiment of the present invention, a settop box may be directly coupled to a television device, and may also be indirectly coupled to one or more content databases through a distributed computer network such as the Internet. In certain embodiments, initially, a system user may activate a personal channel configuration procedure by communicating with a personal channel manager in the settop box by utilizing a wireless remote control device.

The system user may next preferably use any desired techniques to define one or more content categories for performing a content record search procedure to download designated content records. For example, in certain embodiments, the system user may utilize the wireless remote control device and a configuration GUI provided on the television device to perform the personal channel configuration procedure.

The system user may then preferably select appropriate search parameters for performing the foregoing content record search procedure by utilizing any effective means. For example, in certain embodiments, the personal channel manager may preferably provide available search parameters for the defined content categories on the configuration GUI. Next, the system user may preferably specify a maximum number of content records per content category for the content record search procedure.

In certain embodiments, the system user may then preferably specify a date/time range per content category for the content record search procedure. In addition, the system user may preferably specify designated content databases in each content category for the content record search procedure. The system user may also preferably specify a maximum total program duration for a personal channel program comprised of content records that are located during the content record search procedure. Finally, the system user may preferably specify a particular content record sequence or other sorting criteria for organizing the content records that are retrieved from content databases during the content record search procedure.

In certain embodiments, during utilization of the personal television channel, the system user may initially activate a personal channel mode in the settop box by utilizing the wireless remote control device or any other appropriate means. A search module from the personal channel manager may then preferably perform the content record search procedure by searching one or more specified content databases to locate designated content records. The search module may also preferably flag the designated content records when they are located by setting a corresponding download flag in each of the located content records.

The search module may then coordinate operations with respective database servers of the specified content databases to access and download the designated content records. Next, a content packaging module from the personal channel manager may preferably perform a content record sorting procedure by utilizing any appropriate techniques to thereby produce a corresponding personal channel program. For example, the content packaging module may sort downloaded content records in accordance with various sorting criteria that may be specified during the foregoing personal channel configuration procedure. Finally, the system user may preferably view the personal channel program on the television device.

In addition to the foregoing embodiment, the personal television channel may operate in an off-line mode during which the search module may preferably previously perform the content record search procedure at a particular designated time (or may perform the content record search procedure at pre-determined intervals). The content packaging module may then preferably perform the content record sorting procedure in advance, so that the personal channel program is ready for viewing as soon as the system user activates the personal channel mode.

The present invention thus provides an effective methodology for flexibly providing interactive television programming that includes content information which is advantageously directed to specific system user interests. The present invention therefore provides an improved a system and method for effectively implementing a personal channel for interactive television.

DETAILED DESCRIPTION

The present invention relates to an improvement in interactive television systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively implementing a personal channel for interactive television, and may comprise a personal channel manager that may preferably include a configuration module, a search module, and a content packaging module. A system user may preferably utilize the configuration module to perform a personal channel configuration procedure to specify personal channel configuration data for performing a content record search procedure.

The search module may preferably manage the content record search procedure according to one or more search parameters that may be defined during the personal channel configuration procedure. The search manager may selectively locate and access one or more content records from one or more remote content databases during the foregoing content record search procedure. The content packaging module may then responsively coordinate a content record sorting procedure according to user-specified sorting criteria to thereby organize the located content records into a personal channel program. The personal channel program may then preferably be presented upon an interactive television device for viewing by the system user.

Figure 1:
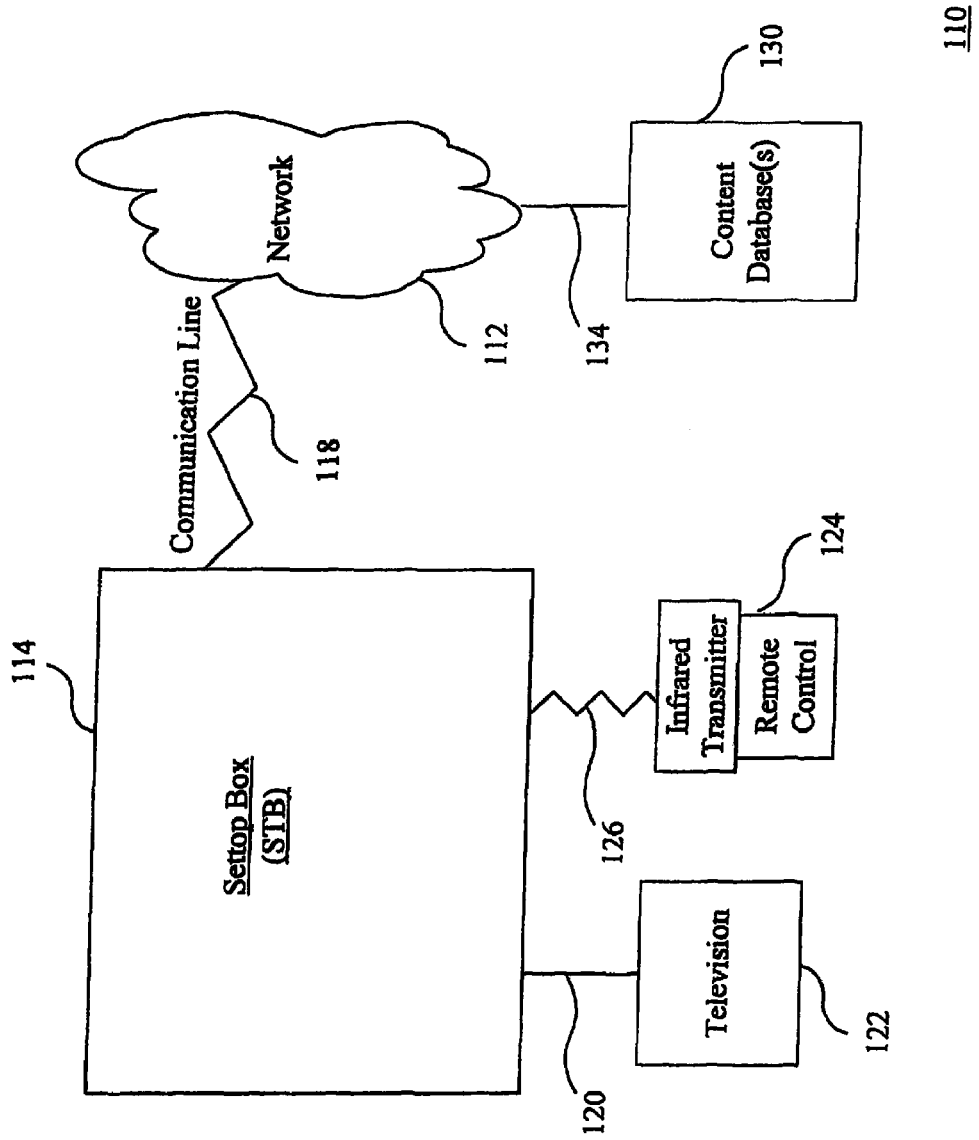
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, a network 112, a settop box (STB) 114, a television 122, a remote control 124, and one or more content databases 130. In alternate embodiments, electronic system 110 may readily be implemented using various components and configurations in addition to, or instead of, those discussed in conjunction with the FIG. 1 embodiment. For example, a computer device (not shown) or other electronic device may readily be coupled to STB 114 to thereby communicate with network 112 or any other device in electronic system 110.

In the FIG. 1 embodiment, settop box (STB) 114 may preferably be implemented as any electronic device that is configured to support and manage various functionalities for utilizing television 122 or other devices (not-shown) in electronic system 110. In the FIG. 1 embodiment, STB 114 may preferably communicate with network 112 via communications line 118, and may further communicate with content databases 130 via path 134. In alternate embodiments, STB 114 may communicate with content databases 130 by utilizing any other desired communication technologies or methods. For example, communications line 118 and path 134 may be high-speed broadband connections in certain instances, and in other environments, a lower-speed dial-up connection may suffice. The operation and utilization of STB 114 is further discussed below in conjunction with FIGS. 4-8.

In the FIG. 1 embodiment, content database(s) 130 may include one or more separate content databases 130 that each may store appropriate content records for a corresponding content provider. For example, a particular broadcasting organization or other programming source may select and catalogue appropriate content records into a corresponding content database 130 for access by STB 114. The implementation and utilization of content database(s) 130 are further discussed below in conjunction with FIGS. 5-8.

In the FIG. 1 embodiment, television 122 may be implemented in any effective and appropriate manner. In certain embodiments, television 122 may preferably be implemented as an interactive television device. In the FIG. 1 embodiment, remote control 124 may preferably be implemented as wireless device that includes an infrared transmitter unit by which a system user may input various types of information via transmission path 126 to control the operation of STB 114. The implementation and utilization of the FIG. 1 electronic system 110 is further discussed below in conjunction with FIGS. 2-8.

Figure 2:
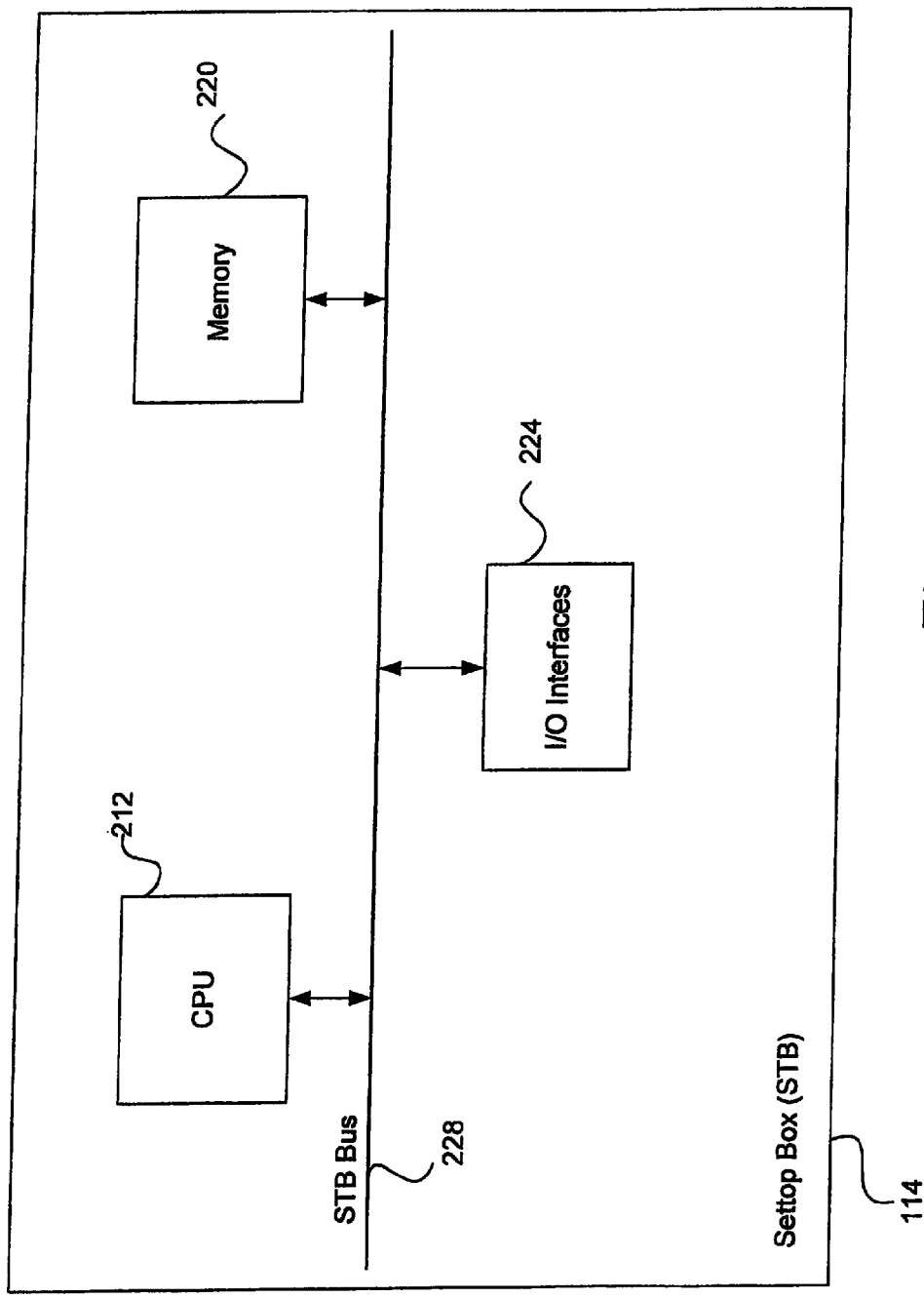
FIG. 2 is a block diagram for one embodiment of the settop box of FIG. 1, in accordance with the present invention.

Referring now to FIG. 2, a block diagram for one embodiment of the FIG. 1 settop box (STB) 114 is shown, in accordance with the present invention. In the FIG. 2 embodiment, STB 114 may preferably include, but is not limited to, a central processing unit (CPU) 212, a memory 220, and input/output interfaces (I/O interfaces) 224. Selected ones of the foregoing components of STB 114 may preferably be coupled to, and communicate through, an STB bus 228. In alternate embodiments, STB 114 may readily be implemented using various components and configurations in addition to, or instead of, those discussed in conjunction with the FIG. 2 embodiment. In addition, STB 114 may alternately be implemented as any other desired type of electronic device or entity. For example, STB 114 may be implemented within television 122 or as part of a personal computer device.

In the FIG. 2 embodiment, CPU 212 may be implemented to include any appropriate and compatible microprocessor device that preferably executes software instructions to thereby control and manage the operation of STB 114. In the FIG. 2 embodiment, memory 220 may be implemented to include any combination of desired storage devices, including, but not limited to, read-only memory (ROM), random-access memory. (RAM), and various types of non-volatile memory, such as floppy disks or hard disks. The contents and functionality of memory 220 are further discussed below in conjunction with FIGS. 3 and 4.

In the FIG. 2 embodiment, I/O interfaces 224 may preferably include one or more input and/or output interfaces to receive and/or transmit any required types of information for STB 114. For example, in the FIG. 2 embodiment, STB 114 may utilize I/O interfaces 224 to communicate with network 110 and content databases 130 via communication line 118 and path 134 respectively (see FIG. 1). Furthermore, STB 114 may utilize I/O interfaces 224 to communicate with TV 122 via path 122 (FIG. 1). In addition, a system user may utilize I/O interfaces 224 to communicate with STB 114 by utilizing any appropriate and effective techniques. For example, a system user may utilize remote control 124 to communicate with STB 114 through I/O interfaces 224.

Figure 3:
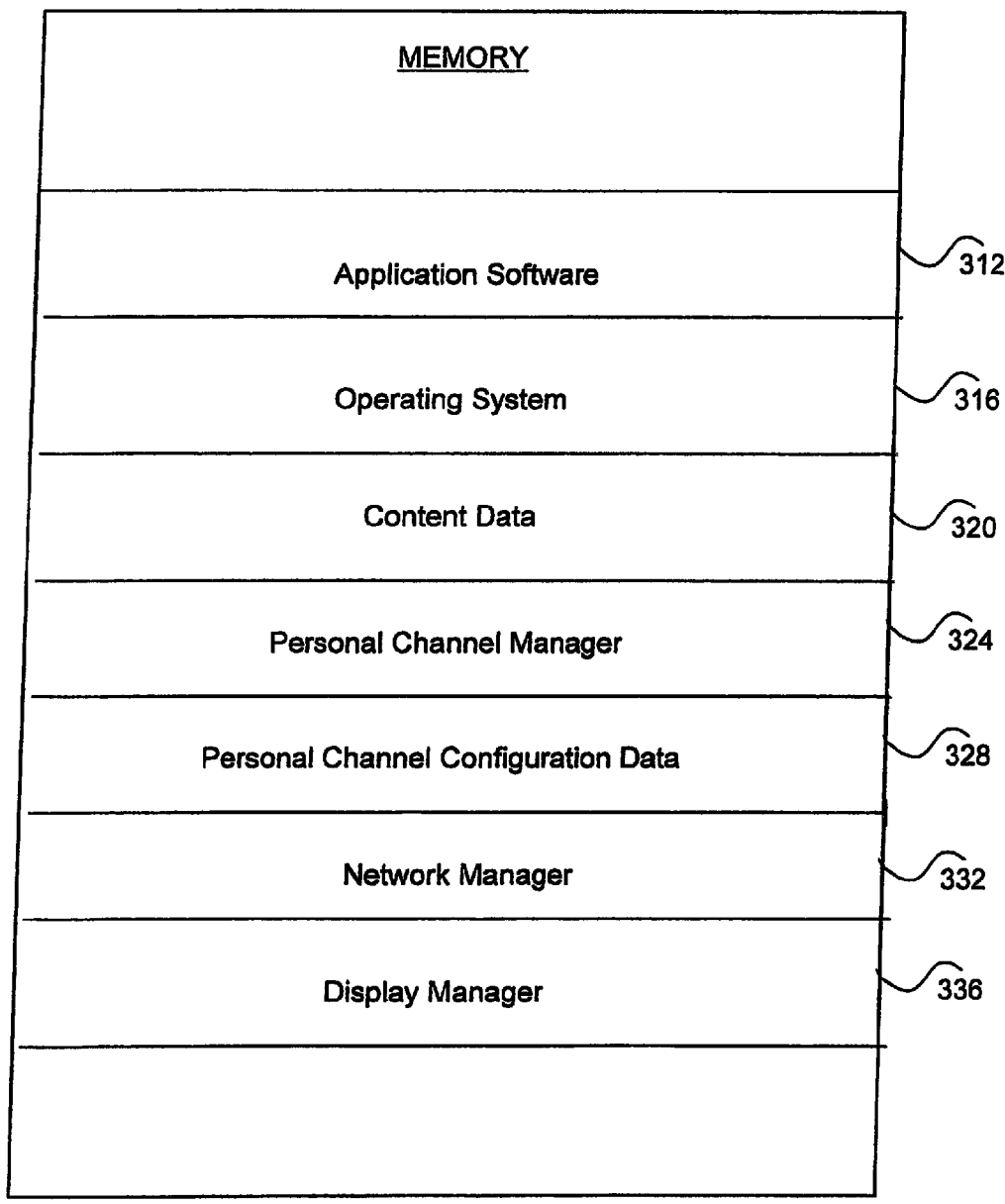
FIG. 3 is a block diagram for one embodiment of the memory of FIG. 2, in accordance with the present invention.

Referring now to FIG. 3, a block diagram for one embodiment of the FIG. 2 memory 220 is shown, in accordance with the present invention. In the FIG. 3 embodiment, memory 220 preferably includes, but is not limited to, application software 312, an operating system 316, one or more types of content data 320, a personal channel manager 324, personal channel configuration data 328, a network manager 332, and a display manager 336. In alternate embodiments, memory 220 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for STB 114. The particular nature and functionality of application software 312 preferably varies depending upon factors such as the specific type and particular functionality of the corresponding STB 114. In the FIG. 3 embodiment, operating system 316 preferably controls and coordinates low-level functionality of STB 114. In the FIG. 3 embodiment, content data 320 may include any appropriate information or data for use by STB 114. For example, content data 320 may include video information and audio information for display on television 122.

In the FIG. 3 embodiment, personal channel manager 324 may preferably coordinate and manage various functions for configuring and utilizing various types of personal channel programming, in accordance with the present invention. In the FIG. 3 embodiment, personal channel configuration data 328 may preferably include any type of information related to a personal channel configuration for STB 114. The implementation and utilization of personal channel manager 324 and personal channel configuration data 328 are further discussed below in conjunction with FIGS. 4 through 8.

In the FIG. 3 embodiment, STB 114 may preferably utilize network manager 332 to communicate with network 112 and content databases 130. In addition, STB 114 may preferably utilize display manager 336 to display various programming and other information on television 122. In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein.

Figure 4:
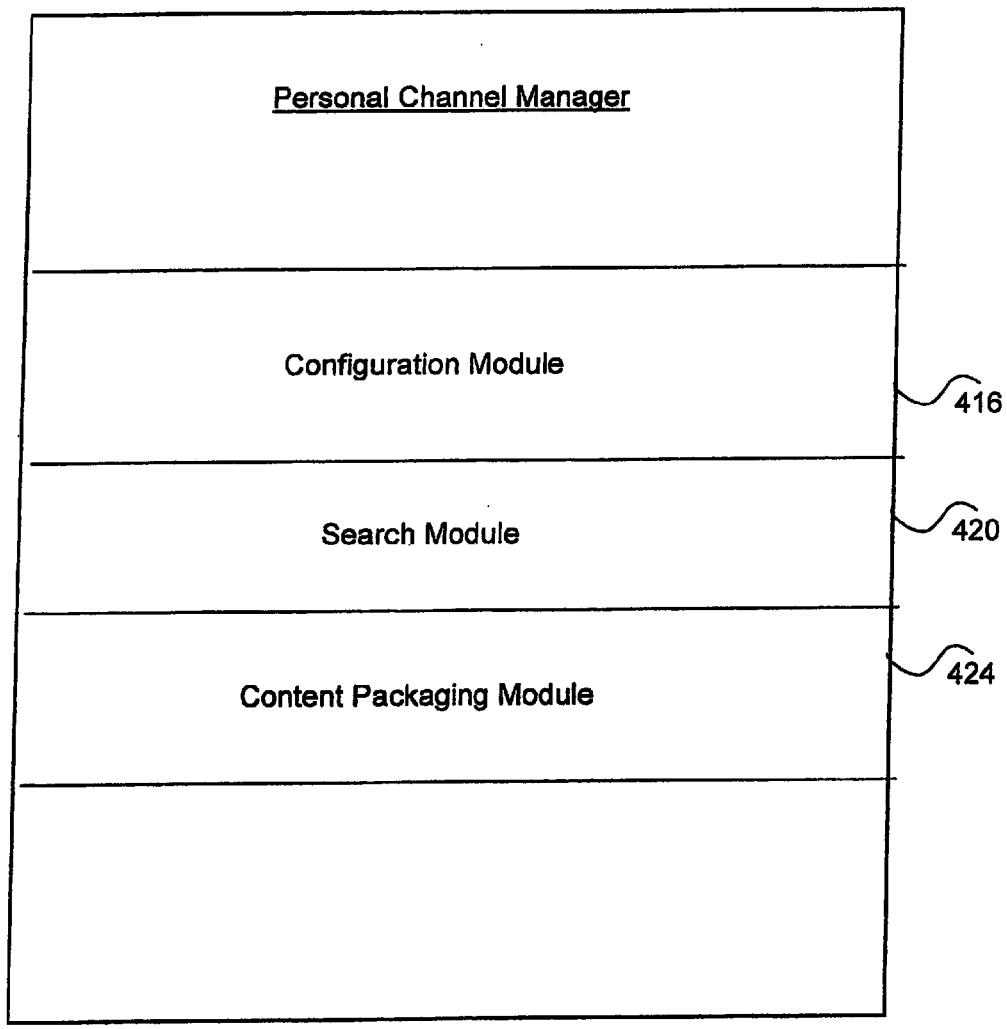
FIG. 4 is a block diagram for one embodiment of the personal channel manager of FIG. 3, in accordance with the present invention.

Referring now to FIG. 4, a block diagram of the FIG. 3 personal channel manager 324 is shown, in accordance with one embodiment of the present invention. In the FIG. 1 embodiment, personal channel manager 324 may preferably include, but is not limited to, a configuration module 416, a search module 420, and a content packaging module 424. In alternate embodiments, personal channel manager 324 may readily be implemented using various components and configurations in addition to, or instead of, those discussed in conjunction with the FIG. 4 embodiment.

In the FIG. 4 embodiment, personal channel manager 324 may preferably utilize configuration module 416 to perform a personal channel configuration procedure to specify certain types of personal channel configuration data 328 (FIG. 3). One embodiment for utilizing configuration module 416 to perform the foregoing personal channel configuration procedure is further discussed above in conjunction with FIG. 7.

In the FIG. 4 embodiment, personal channel manager 324 may preferably utilize search module 420 to perform a content record search procedure to locate designated types of content records from one or more corresponding content databases 130. One embodiment for utilizing search module 420 to perform the foregoing content record search procedure is further discussed above in conjunction with FIG. 8.

In the FIG. 4 embodiment, personal channel manager 324 may preferably utilize content packaging module 424 to perform a content record sorting procedure to thereby create a corresponding personal channel program for viewing by a system user. One embodiment for utilizing content packaging module 424 to perform the foregoing content record sorting procedure is further discussed above in conjunction with FIG. 8.

Figure 5:
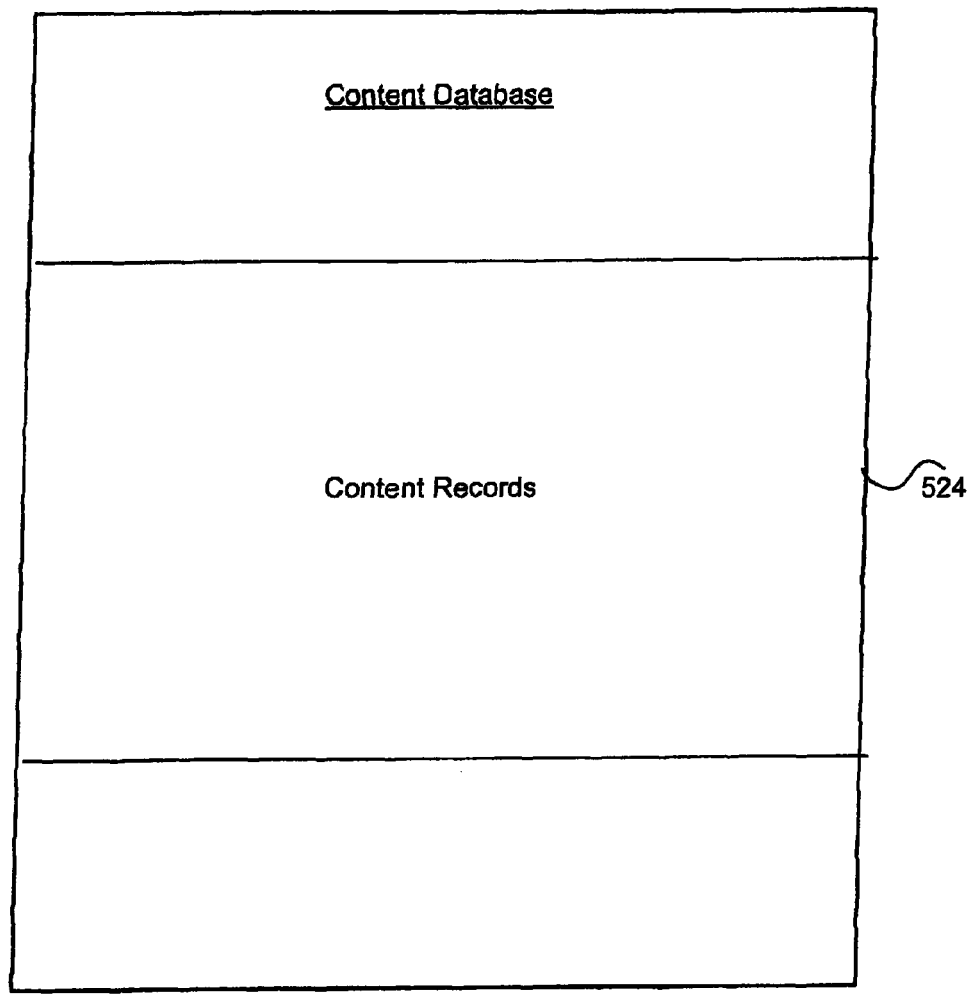
FIG. 5 is a block diagram for one embodiment of a content database from FIG. 1, in accordance with the present invention.

Referring now to FIG. 5, a block diagram illustrating one embodiment of a FIG. 1 content database 130 is shown, in accordance with the present invention. In the FIG. 5 embodiment, content database 130 may preferably include, but is not limited to, one or more content records 524. In alternate embodiments, content database 130 may readily be implemented using various components and configurations in addition to, or instead of, those discussed in conjunction with the FIG. 5 embodiment.

In the FIG. 5 embodiment, content records 524 may include a series of individual segments of selected program content information. One embodiment for an exemplary content record 524 is further discussed below in conjunction with FIG. 6. In certain embodiments, a database server (not shown) may preferably include any appropriate entities that are configured to manage bi-directional communications and data transfer operations for one or more content database 130. The particular nature and functionality of the database server may preferably vary depending upon factors such as the specific type and particular functionality of the corresponding content database(s) 130.

Figure 6:
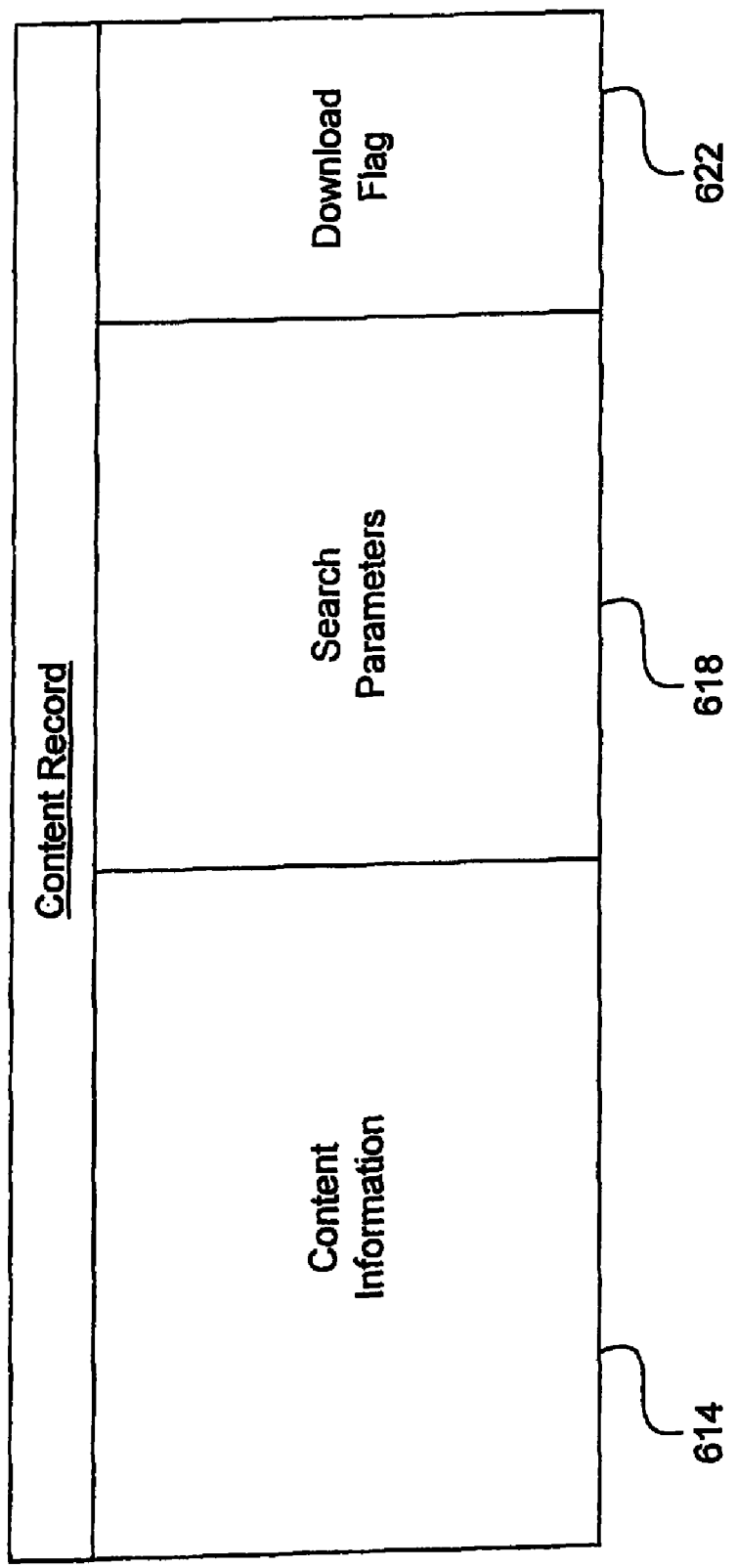
FIG. 6 is a block diagram for one embodiment of a content record from FIG. 5, in accordance with the present invention.

Referring now to FIG. 6, a block diagram of a FIG. 5 content record 524 is shown, in accordance with one embodiment of the present invention. In the FIG. 6 embodiment, content record 524 may preferably include, but is not limited to, one or more types of content information 614, one or more search parameters 618, and a download flag 622. In alternate embodiments, content record 524 may readily be implemented using various components and configurations in addition to, or instead of, those discussed in conjunction with the FIG. 6 embodiment.

In the FIG. 6 embodiment, content information 614 may include any appropriate information for presentation by STB 114 on television 122, or for utilization by a system user via any other appropriate reproduction devices. For example, content information 614 may include video and/or audio information for presentation on television 122. Content information 614 may also include text or graphics information for presentation on television 122. In the FIG. 6 embodiment, download flag 622 may preferably be set by search module 420 (FIG. 4) of personal channel manager 324 whenever a content record search procedure affirmatively identifies a corresponding content record 524 as a search target. In the FIG. 6 embodiment, search parameters 618 may preferably include any appropriate means for identifying a particular content record 524 as a search target during a content record search procedure. In certain embodiments of the present invention, a content provider may preferably define certain appropriate search parameters 618 in content records 524, depending upon the nature of the corresponding content information 614. A system user may then enter one or more of those search parameters 618 as personal channel configuration data 328 (FIG. 3) during a personal channel configuration procedure. A search module 420 may responsively compare the personal channel configuration data 328 with search parameters 618 in content records 524 to thereby identify those designated content records 524 that are of interest to the system user.

The foregoing search parameters 618 may include any effective information for identifying corresponding content information 614. For example, search parameters 618 may preferably include, but are not limited to, keywords related to content information 614, a content category, a content type, a content date/time, and a content provider. In certain embodiments, search parameters 618 may also include information or data obtained directly from video data and/or audio data within content information 614. For example, search parameters 618 may include various types of audio/video signatures. The selection and utilization of search parameters is further discussed below in conjunction with FIGS. 7 and 8.

Figure 7:
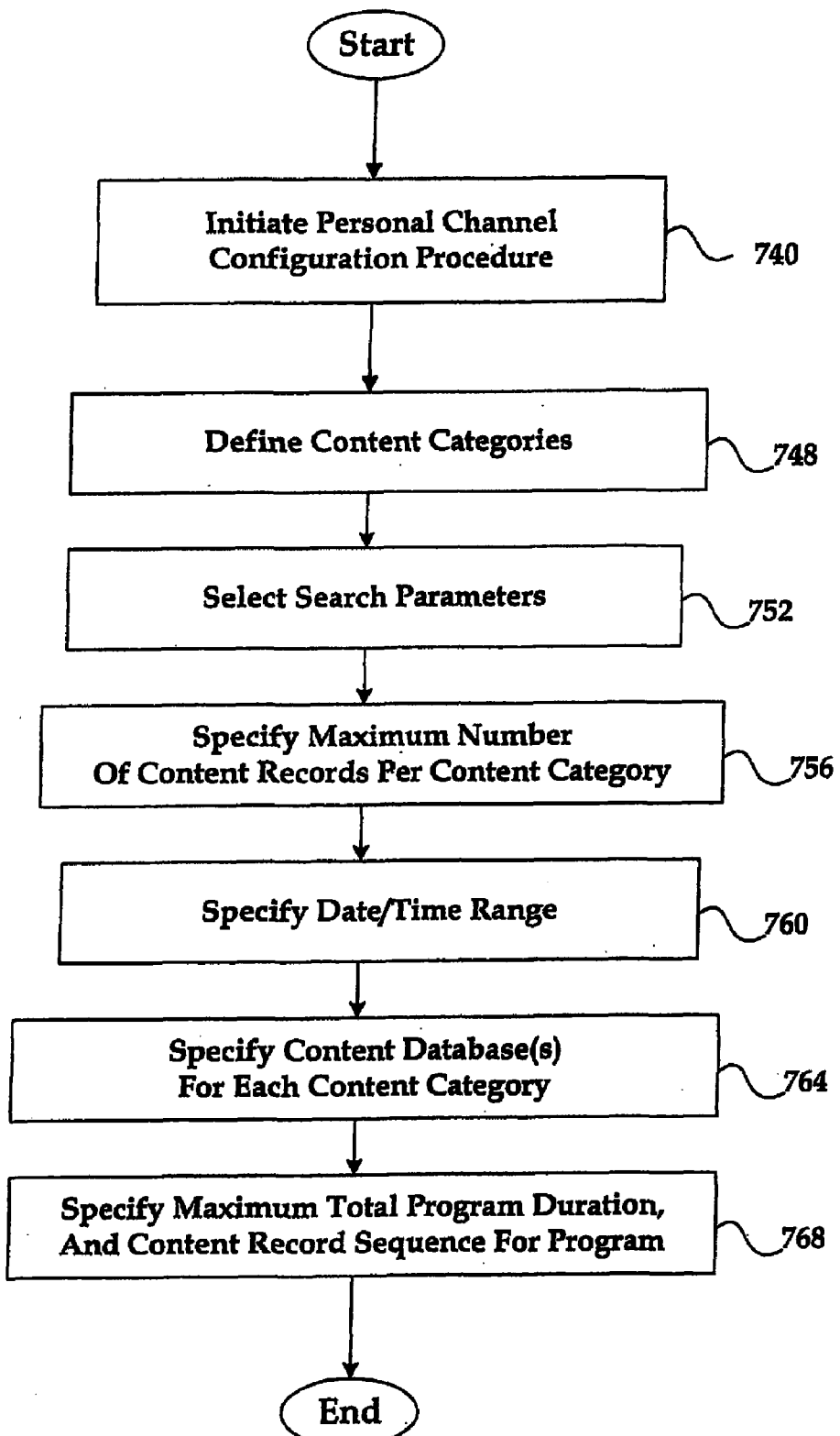
FIG. 7 is a flowchart of method steps for performing a personal channel configuration procedure, in accordance with one embodiment of the present invention.

Referring now to FIG. 7, a flowchart of method steps for performing a personal channel configuration procedure is shown, in accordance with one embodiment of the present invention. The FIG. 7 example is presented for purposes of illustration, and in alternate embodiments, the present invention may readily utilize various steps and sequences other than those discussed in conjunction with the FIG. 7 embodiment.

In the FIG. 7 embodiment, in step 740, a system user or other appropriate entity may initiate a personal channel configuration procedure in STB 114 (FIG. 1) by utilizing any effective means. For example, in certain embodiments, a system user may utilize remote control 124 (FIG. 1) to initiate the foregoing personal channel configuration procedure. Then, in step 748, the system user or other appropriate entity may preferably use any desired techniques to define one or more content categories for performing a content record search procedure.

For example, in certain embodiments of the foregoing personal channel configuration procedure, a configuration module 416 from a personal channel manager 324 and a display manager 336 of STB 114 may preferably generate a configuration graphical user interface (GUI) on television 122. The system user may responsively utilize remote control 124 to input appropriate information during the personal channel configuration procedure. In certain embodiments, during step 748, the foregoing configuration GUI may preferably initially display one or more main content topics, and the system user may then define narrower content categories within the main content topics. For example, the system user could narrow a main topic entitled "News" by defining a content category entitled "United States News".

In step 752, the system user or another entity may preferably select appropriate search parameters for performing the foregoing content record search procedure by utilizing any effective techniques. For example, in certain embodiments, the system user may utilize the foregoing configuration GUI and remote controller 124 to input appropriate search parameters during the personal channel configuration procedure. In certain embodiments, personal channel manager 324 may preferably provide available search parameters for the defined content categories on the configuration GUI.

Then, in step 756, the system user or another entity may preferably specify a maximum number of content records 524 per content category for the content record search procedure. Next, in step 760, the system user or another entity may preferably specify a date/time range per content category for the content record search procedure. In certain alternate embodiments, only a date range (without a corresponding time) may be specified in step 760.

In step 764, the system user or another entity may preferably specify designated content database(s) 130 in each content category for the content record search procedure. Finally, in step 768, the system user or other entity may preferably specify a maximum total program duration for the personal channel program. In addition, during step 768, the system user or other entity may also specify a particular content record sequence for sorting content records 524 that are retrieved from content database(s) during the content record search procedure.

For example, in certain embodiments, the system user may select a default sorting order that may be pre-determined. The system user may also select a sorting order that is based upon content categories, or which may be based upon the prior sorting history of personal channel programs in STB 114. Alternately, the system user may sort the retrieved content records 524 according to criteria which include, but are not limited to, search parameters for the particular content record search procedure or the chronological dates of retrieved content records 524.

Figure 8:
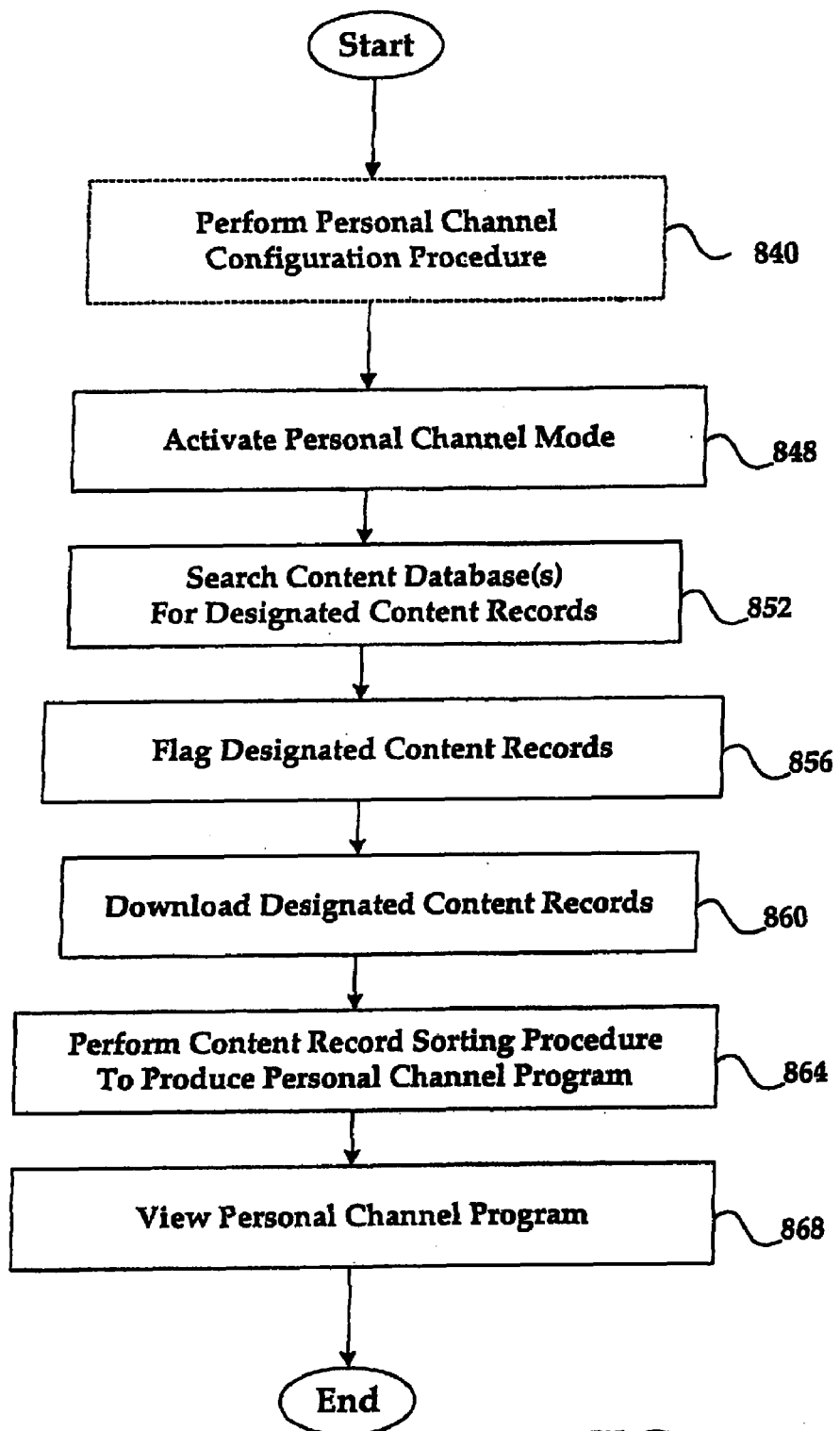
FIG. 8 is a flowchart of method steps for effectively utilizing a personal television channel, in accordance with one embodiment of the present invention.

Referring now to FIG. 8, a flowchart of method steps for utilizing a personal television channel is shown, in accordance with one embodiment of the present invention. The FIG. 8 example is presented for purposes of illustration, and in alternate embodiments, the present invention may readily utilize various steps and sequences other than those discussed in conjunction with the FIG. 8 embodiment.

In the FIG. 8 embodiment, in step 840, a system user or other appropriate entity may preferably perform a personal channel configuration procedure, as discussed above in conjunction with FIG. 7. Alternately, in certain embodiments, personal channel configuration data (328) may be provided as part of STB 114, or may be obtained from an appropriate data source such as the Internet. In the FIG. 8 embodiment, step 840 is shown within a dotted box to signify that the personal channel configuration procedure need not be performed each time the personal television channel is utilized. For example, in many embodiments, the personal channel configuration procedure of step 840 is most typically performed before initial use of the personal television channel, and thereafter only periodically.

In step 848, the system user or other appropriate entity may preferably activate a personal channel mode in STB 114 by utilizing any appropriate techniques. For example, in certain embodiments, the system user may utilize remote control 124 to activate the personal channel mode in STB 114. In step 852, a search module 420 from a personal channel manager 324 of STB 114 may preferably perform a content record search procedure by searching one or more specified content database(s) 130 to locate designated content records 524. In accordance with the present invention, search module 420 may utilize any effective means to perform the foregoing content record search procedure. For example, search module 420 may utilize search parameters 618 to perform the content record search procedure, as discussed above in conjunction with FIG. 6.

In step 856, search module 420 may preferably flag the designated content records 524, when they are located, by utilizing any desired method. For example, search module 420 may set a corresponding download flag 622 in the located content record 524, as discussed above in conjunction with FIG. 6. Then, in step 860, search module 420 may preferably coordinate operations with respective database servers of content database(s) 130 to download the designated content records 524.

Then, in step 864, a content packaging module 424 may preferably perform a content record sorting procedure by utilizing any appropriate techniques to thereby produce a corresponding personal channel program. In accordance with the present invention, content packaging module 424 may preferably sort downloaded content records 524 in accordance with various criteria that may be specified during the foregoing personal channel configuration procedure, as discussed above in conjunction with FIG. 7. Finally, in step 868, the system user may preferably view the personal channel program on television 122.

In accordance with the present invention, the foregoing personal channel mode is described in the context of an on-line mode during which the search module 420 may preferably perform the content record search procedure immediately after the system user activates the personal channel mode, and the content packaging module 424 may then preferably perform a content record sorting procedure before the system user is able to view the completed personal channel program. The foregoing on-line mode would also be appropriate for the live streaming of content records 524 for display on television 122.

Alternately, the personal channel mode may operate in an off-line mode during which the search module 420 may preferably previously perform the content record search procedure at a particular designated time (or may perform the content record search procedure at pre-determined intervals). In the off-line mode, the content record search procedure may also be an ongoing and continuous procedure of searching and downloading designated content records. The content packaging module 424 may then preferably perform the content record sorting procedure in advance, so that the personal channel program is ready for viewing as soon as the system user activates the personal channel mode. The present invention thus provides an effective methodology for flexibly providing interactive television programming that includes content information which is advantageously directed to specific system user interests.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing a personal channel, comprising:
    a search module executing a procedure according to at least one search parameter defined by a user module sending to the search module request data for performing a search of files stored in at least one database, at least some of the files including at least audio data, or at least video data, the user module specifying a maximum number of files to retrieve during the search of files according to the request data; and
    wherein a third module uses a processor to automatically coordinate a sorting procedure to organize the files into a program for delivery thereof to a user of the user module, the modules being embodied in at least one computer-readable medium, wherein the program is assembled using program sequence and program format for a convenient use by said user.

2. A method for implementing a personal channel, comprising:
    receiving, from a configuration procedure, channel configuration data for performing a search procedure for files including specifying a maximum number of files to return per each of a specified category of files desired;
    managing the search procedure with a search module according to one or more search parameters that are defined by the configuration procedure, the search module accessing one or more files during said search procedure, said files each including audio data, video data, or both audio and video data, the files being stored on one or more content databases; and
    automatically coordinating using a processor a sorting procedure with a content packaging module according to sorting criteria to organize said files into a personal channel program, wherein said personal channel program is assembled in a pre-defined program sequence and a pre-defined program format for a convenient use by said system user.

3. The method of claim 2 further comprising presenting said personal channel program upon at least one of a personal computer, a portable electronic device for utilization by said system user.

4. A system for implementing a personal channel, comprising:
    a search module configured to communicate with a configuration module usable by a system user to perform a personal channel configuration procedure during which personal channel configuration data is specified by said system user for performing a search procedure, said personal channel configuration data including content categories and search parameters;
    the search module being configured to perform said search procedure according to said search parameters that are defined during said personal channel configuration procedure using the configuration module, said search module configured to selectively access one or more files from one or more remote content databases during said search procedure, said files including at least video data or at least audio data; and
    wherein a content packaging module uses a processor configured to automatically coordinate a sorting procedure according to predefined sorting criteria to organize said files into a personal channel program for delivery of the personal channel program to a user of the configuration module, at least one of the modules being embodied on a tangible computer-readable medium, wherein said personal channel program is assembled using program sequence and program format.

5. The system of claim 4 wherein said personal channel program is presented for utilization by said system user upon at least one of a personal computer, a portable electronic device.

* * * * *